Patented May 2, 1950

2,506,348

UNITED STATES PATENT OFFICE 2,506,348

LEAD-BASE SOLDER

Fred Davis, Lynn, Mass., assignor to General Electric Company, a corporation of New York No Drawing. Application December 15, 1948, Serial No. 65,505

3 Claims. (Cl. 75—166)

The present invention relates to lead alloys. It is particularly concerned with lead-base solder alloys.

A primary object of the present invention is to provide a high melting point lead-base alloy.

A further object of the invention is to provide a lead-base solder having good strength at elevated temperatures in the neighborhood of 500° F.

In accordance with the present invention, there is provided a lead-base solder in the form of an alloy of lead, antimony, silver, copper, and cadmium. In general, the solder should contain from 10 to 11% antimony, 7 to 8% silver, 1 to 2% copper, and 2 to 3% cadmium, balance lead except for incidental impurities. The lead or lead plus impurity content of the alloy will ordinarily range from about 77 to 79% by weight. A preferred alloy within the scope of the present invention consists of about 78% lead, 10.3% antimony, 7.7% silver, 1.5% copper, and 2.5% cadmium.

The preferred procedure for preparing the solder comprises melting the lead, adding the antimony to the melt and raising the temperature to 1100° F. with stirring until solution is obtained. The silver and copper are then added and the temperature raised to 1200° F. until these additions go into solution. After lowering the temperature to 1000° F., the cadmium is added, and when alloying is complete, the whole is cast in chill molds.

The resultant solder has a melting or softening point at about 600° F. and is liquid at 800° F. The material is very ductile and has excellent flowing and wetting characteristics. The alloy is particularly characterized by good tensile strength at elevated temperatures. Cast bars of the alloy loaded to 1000 p. s. i. did not fail at temperatures up to 500° F. and exhibited good elongation during the test.

From the above description, it will be seen that there has been provided an alloy which is particularly valuable for soldering applications in which the soldered part or parts are intended for operation at temperatures too high for the ordinary lead-tin solders, for example, up to temperatures of 500° F.

In using the solder of the present invention, it has been found that ordinary non-corrosive fluxes, such as rosin, are not particularly satisfactory due to carbonization of the flux at the temperatures required to flow the solder. A flux which has given excellent results can be prepared from the mixture of about 35% lactic acid, 23% water, 42% ethyl alcohol to which has been added sufficient finely powdered boric acid to make a saturated solution.

It has also been found that for best results there should be used a soldering tool or applicator having a graphite tip. With the usual soldering equipments, such as a copper or iron-clad, copper-tipped soldering iron, it has been found that excessive formation of oxides on the surfaces of such applicators may interfere with the soldering operations. The substitution of a graphite tip avoids such excessive oxidation and gives excellent results regardless of the nature of the surfaces being joined.

What I claim as new and desire to secure by Letters Patent of the United States is:

1. A solder consisting of from 10 to 11% antimony, 7 to 8% silver, 1 to 2% copper, 2 to 3% cadmium, balance lead except for impurities.

2. A solder consisting of from 77 to 79% lead, 10 to 11% antimony, 7 to 8% silver, 1 to 2% copper, and 2 to 3% cadmium.

3. A solder consisting of 78% lead, 10.3% antimony, 7.7% silver, 1.5% copper, and 2.5% cadmium.

FRED DAVIS.

REFERENCES CITED

The following references are of record in the file of this patent:

UNITED STATES PATENTS

| Number | Name | Date |
|---|---|---|
| 2,299,711 | Gillett | Oct. 20, 1942 |